US008509763B2

(12) United States Patent
Catovic et al.

(10) Patent No.: US 8,509,763 B2
(45) Date of Patent: Aug. 13, 2013

(54) METHODS AND APPARATUS FOR EVALUATING BASE STATION EFFICIENCY IN A NETWORK

(75) Inventors: Amer Catovic, San Diego, CA (US); Christophe Chevallier, San Diego, CA (US); Mustafa Saglam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 12/614,271

(22) Filed: Nov. 6, 2009

(65) Prior Publication Data

US 2011/0111752 A1      May 12, 2011

(51) Int. Cl.
*H04W 72/00* (2009.01)
*H04W 4/00* (2009.01)
*H04B 7/00* (2006.01)

(52) U.S. Cl.
USPC ............ 455/424; 455/453; 455/522; 370/329

(58) Field of Classification Search
USPC ................. 455/424, 453, 522; 370/252, 329
See application file for complete search history.

(56) References Cited

U.S. PATENT DOCUMENTS

| 2008/0176554 | A1  | 7/2008 | Gibbons et al. |         |
|--------------|-----|--------|----------------|---------|
| 2009/0069007 | A1* | 3/2009 | Xiao           | 455/424 |
| 2009/0154403 | A1* | 6/2009 | Niwano         | 370/329 |
| 2011/0007645 | A1* | 1/2011 | Tompson et al. | 370/252 |

FOREIGN PATENT DOCUMENTS

| WO | WO0249237 A2   | 6/2002 |
|----|----------------|--------|
| WO | WO2009065173 A1| 5/2009 |

OTHER PUBLICATIONS

International Search Report and Written Opinion—PCT/US2010/055742, International Search Authority—European Patent Office—Feb. 24, 2011.
Universal Mobile Telecommunications System (UMTS), Physical layer, Measurements (FDD) (3GPP TS 25.215 version 8.3.0 Release 8), ETSI TS 125 215, ETSI Standard, European Telecommunications Standards Institute (ETSI), Sophia Antipolis Cedex, France, vol. 3-R1, No. V8.3.0, Mar. 1, 2009, XP014043966.

* cited by examiner

*Primary Examiner* — Nizar Sivji (57) ABSTRACT

A method and apparatus evaluating base station efficiency in a network. The method may comprises: obtaining, from a plurality of base stations, cell performance measurements, wherein the cell performance measurements include a transmitted carrier power value and a dedicated channel (DCH) power value, generating a plurality of cell efficiency coefficients for each of the plurality of base stations by processing the obtained cell performance measurements, determining if at least one of the plurality of base stations is an inefficient base station from at least one of the plurality of cell efficiency coefficients, and transmitting at least one network modification suggestion, wherein the at least one network modification suggestion is based on the at least one of the plurality of cell efficiency coefficients used in determining the at least one inefficient base station.

33 Claims, 7 Drawing Sheets

METHODS AND APPARATUS FOR EVALUATING BASE STATION EFFICIENCY IN A NETWORK

BACKGROUND

1. Field

The present application relates generally to wireless communications, and more specifically to methods and systems for monitoring wireless network efficiency.

2. Background

Wireless communication systems are widely deployed to provide various types of communication (e.g., voice, data, multimedia services, etc.) to multiple users. These systems may be multiple-access systems capable of supporting communication with multiple users by sharing the available system resources (e.g., bandwidth and transmit power). Examples of such multiple-access systems include Universal Mobile Telecommunications System (UMTS), code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, wireless communication systems can contemporaneously support communication for multiple mobile devices. Each mobile device can communicate with one or more network elements (e.g. base stations) via transmissions on forward and reverse links. The forward link (or downlink) refers to the communication link from base stations to mobile devices, and the reverse link (or uplink) refers to the communication link from mobile devices to base stations.

Currently, wireless network operators have difficulties in monitoring networks in a network-centric methodology/decision framework. Consequently, it would be desirable to have an efficient method and/or apparatus for evaluating base station efficiency in a network-centric manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with evaluating base station efficiency in a network. According to one aspect, a method for evaluating base station efficiency in a network is provided. The method may include obtaining, from a plurality of base stations, cell performance measurements, wherein the cell performance measurements include a transmitted carrier power value and a dedicated channel (DCH) power value for each of the plurality of base stations. Further, the method may include generating a plurality of cell efficiency coefficients for each of the plurality of base stations by processing the obtained cell performance measurements. Additionally, the method may include determining if at least one of the plurality of base stations is an inefficient base station from at least one of the plurality of cell efficiency coefficients. Moreover, the method may include transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

Yet another aspect relates to at least one processor configured to evaluate base station efficiency in a network. The processor may include a first module for obtaining, from a plurality of base stations, cell performance measurements, wherein the cell performance measurements include a transmitted carrier power value and a dedicated channel (DCH) power value for each of the plurality of base stations. Further the processor may include a second module for generating a plurality of cell efficiency coefficients for each of the plurality of base stations by processing the obtained cell performance measurements. Additionally, the processor may include a third module for determining if at least one of the plurality of base stations is an inefficient base station from at least one of the plurality of cell efficiency coefficients. Moreover, the processor may include a fourth module for transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

Still another aspect relates to a computer program product comprising a computer-readable medium. The computer program product may include a computer-readable medium including a first set of codes for causing a computer to obtain, from a plurality of base stations, cell performance measurements, wherein the cell performance measurements include a transmitted carrier power value and a dedicated channel (DCH) power value for each of the plurality of base stations. The computer program product may further include a computer-readable medium including a second set of codes for causing the computer to generate a plurality of cell efficiency coefficients for each of the plurality of base stations by processing the obtained cell performance measurements. The computer program product may still further include a computer-readable medium including a third set of codes for causing the computer to determine if at least one of the plurality of base stations is an inefficient base station from at least one of the plurality of cell efficiency coefficients. Additionally, the computer program product may include a computer-readable medium including a fourth set of codes for causing the computer to transmit at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

Yet another aspect relates to an apparatus. The apparatus may include means for obtaining, from a plurality of base stations, cell performance measurements, wherein the cell performance measurements include a transmitted carrier power value and a dedicated channel (DCH) power value for each of the plurality of base stations. The apparatus may further include means for generating a plurality of cell efficiency coefficients for each of the plurality of base stations by processing the obtained cell performance measurements. Additionally, the apparatus may include means for determining if at least one of the plurality of base stations is an inefficient base station from at least one of the plurality of cell efficiency coefficients. Moreover, the apparatus may include means for transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

Another aspect relates to an apparatus. The apparatus may include a communications module for obtaining, from a plurality of base stations, cell performance measurements, wherein the cell performance measurements include a transmitted carrier power value and a dedicated channel (DCH) power value for each of the plurality of base stations. Further, the apparatus may include a network efficiency module for: generating a plurality of cell efficiency coefficients for each of the plurality of base stations by processing the obtained cell performance measurements, and determining if at least one of the plurality of base stations is an inefficient base station from at least one of the plurality of cell efficiency coefficients. Additionally, the apparatus may include a communication module that is further operable for transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
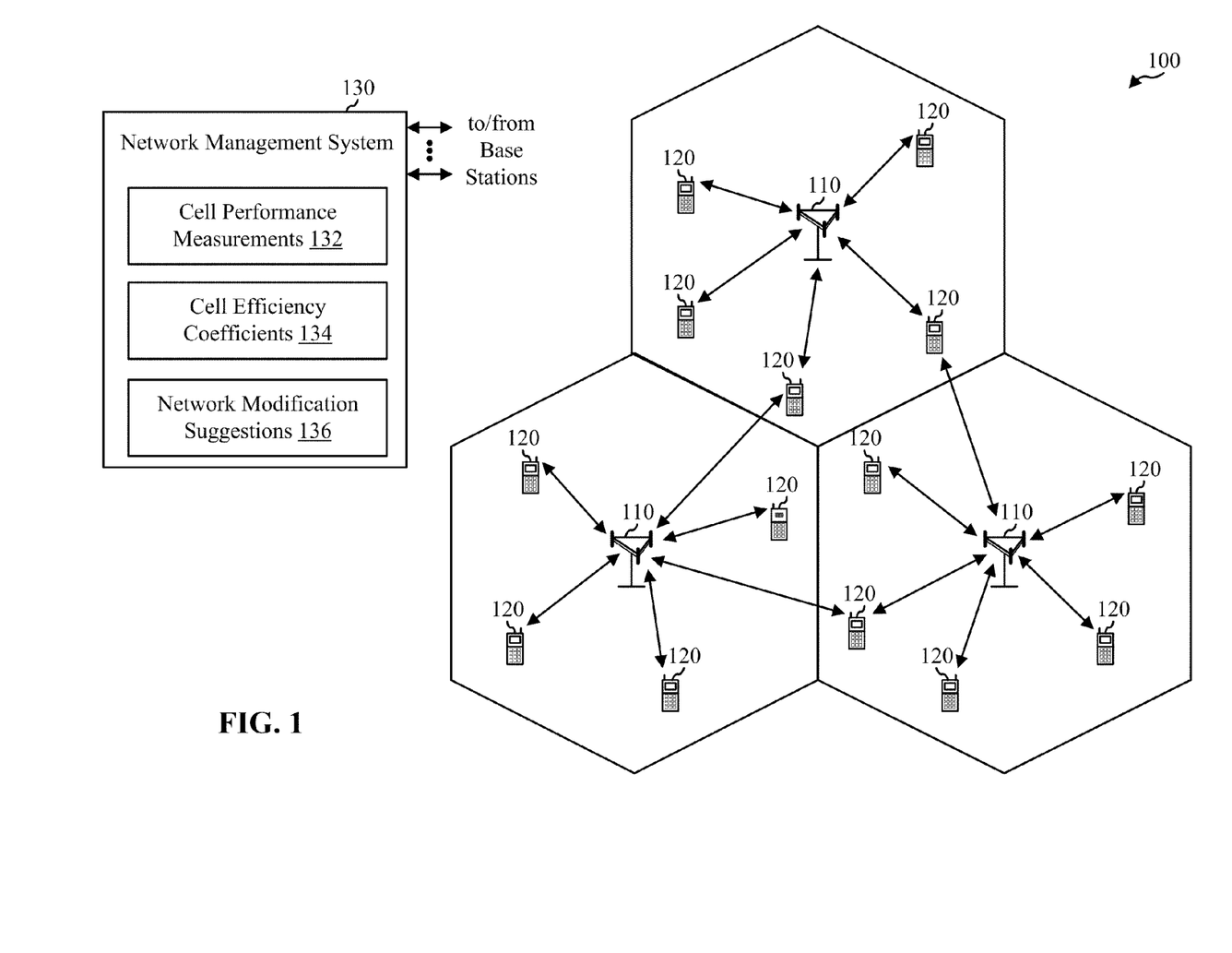
FIG. 1 illustrates a block diagram of a communication network according to an aspect.

With reference to FIG. 1, a block diagram of a communication network 100 according to an aspect is illustrated. Turning to FIG. 1, illustrated is a wireless communication system 100 with a number of base stations 110 that support communication for a number of wireless terminals 120. A base station is a fixed station used for communicating with the terminals and can also be called an access point, a base transceiver station (BTS), a NodeB, or some other terminology. A terminal may be fixed or mobile and may also be called a mobile station (MS), a mobile equipment (ME), a user equipment (UE), a wireless device, a subscriber unit, or some other terminology. The terminals may be dispersed throughout the system. Each base station may communicate with any number of terminals at any given moment depending on various factors such as, for example, the number of terminals within the coverage (e.g., cell) of the base station, the available system resources, the data requirements of the terminals, and so on. An network management system 130 may monitor, coordinate and/or control the base stations. The network management system 130 may comprise a radio network controller (RNC), an efficiency specific server, etc.

In one aspect, network management system 130 may further include modules to obtain and/or store cell performance measurements 132, cell efficiency coefficients 134, and produce network modification suggestions 136. In one aspect, cell performance measurements 132 may include dedicated channel (DCH) power measurements and transmitted carrier power measurements from the base stations 110. In one aspect, cell performance measurements 132 may be provided to network management system 130 as the measurements are generated at the base stations. In another aspect, cell performance measurements 132 may be provided to network management system 130 periodically with values being averaged at base stations 110. In yet another aspect, cell performance measurements 132 may be provided to network management system 130 in response to a request by network management system.

In one aspect, obtained cell performance measurements 132 may be used to derive cell efficiency coefficients 134. In such an aspect, dedicated channel (DCH) power measurements ($E_c$) and transmitted carrier power measurements ($I_{or}$) may be used to derive cell efficiency coefficients 134 ("p," "q" and "r") as seen in equations (1) to (4).

$$\frac{E_c}{I_{or}} = p \cdot r + \frac{q \cdot r}{I_{or}} \quad (1)$$

wherein:

$$p = (1 - \alpha + f) \quad (2)$$

$$r = \frac{E_b}{N_t} \cdot \frac{1}{PG} \quad (3)$$

$$q = N_{th} + L \quad (4)$$

were: $\alpha$ represents an orthogonality factor, f represents an other-cell interference factor ($I_{oc}/I_{or}$), $I_{or}$ represent other-cell interference power, $E_b$ represents bit energy of the DCH, $N_t$ represents total noise power density, PG represents processing gain, $N_{th}$ represents thermal noise, and L represents path loss.

In such an aspect, cell efficiency coefficients 134 ("p," "q" and "r") may provide indications of various cell inefficiencies. For example, a high value of p obtained for one or more base stations among measured base stations 110 may indicate interference issues in the area served by the one or more base stations and may indicate that the one or more base stations are comparatively better candidates for further radio frequency (RF) evaluation and/or RF optimization so as to increase network capacity. In another example, a high value of r among measured base stations 110 may indicate channel quality issues. Such base stations may be comparatively better candidates for offloading high mobility traffic to increase network capacity. In yet another example, a high value of q among measured base stations 110 may indicate large path loss. In such an example, path loss may result from usage in locations in which the distance to a serving base station is relatively large. As such, a network operator may suggest adding network hardware, such as additional base stations 110 to the region near a base station with a comparatively high value of q. In one aspect, determination of a high value for cell efficiency coefficients can be performed comparatively with respect to other base stations, or it can be performed by comparison to one or more predetermined thresholds.

Further, any combination of metrics derived from cell efficiency coefficients 134, such as the examples described above, may be used to generate network modification suggestions 136. In one aspect, such network modification suggestions 136 may be provided to a network operator, and/or may be automatically implemented.

Accordingly, network management system 130 may evaluate efficiency of a plurality of base stations 110 through analyzing derived cell efficiency coefficients.

Figure 2:
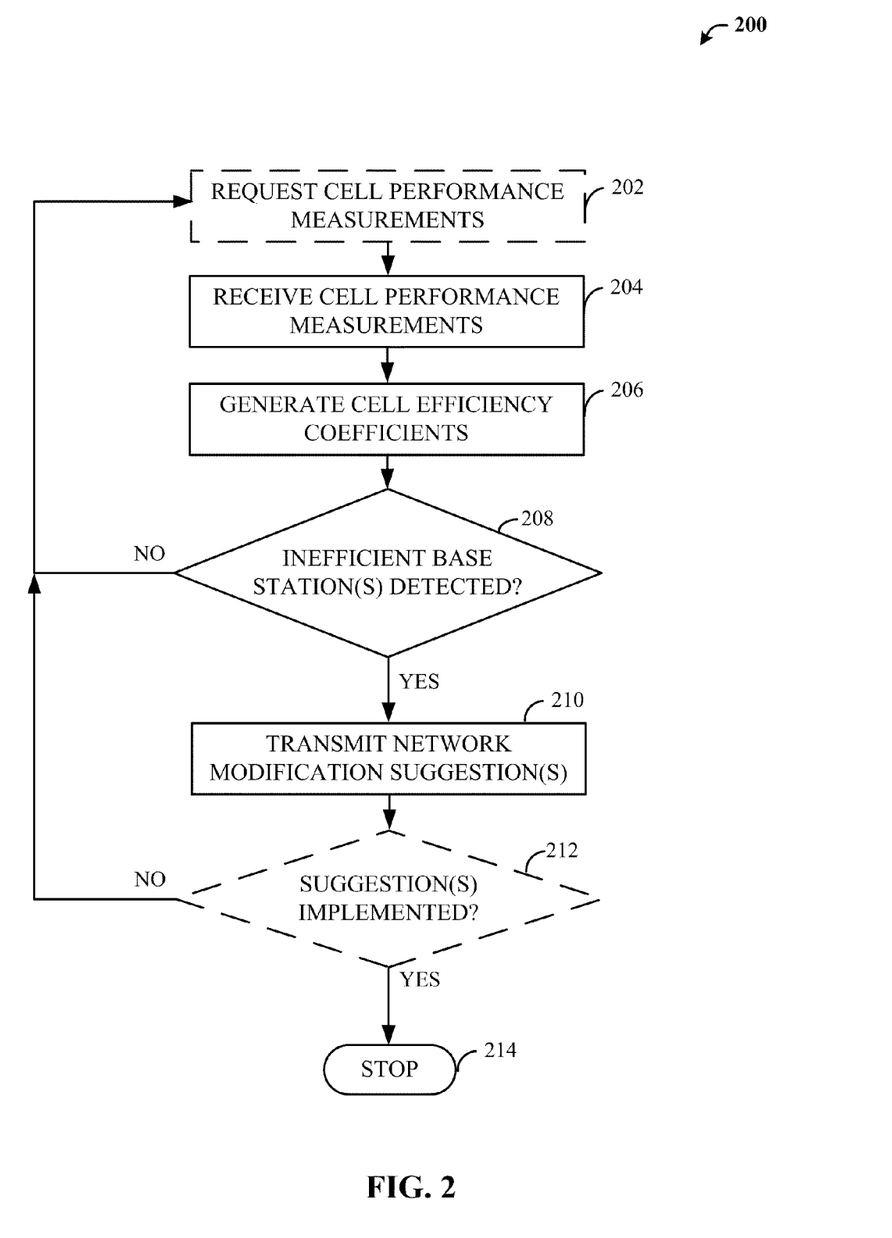
FIG. 2 is a flowchart of an aspect of an overview of a communication network efficiency evaluation process.
Figure 3:
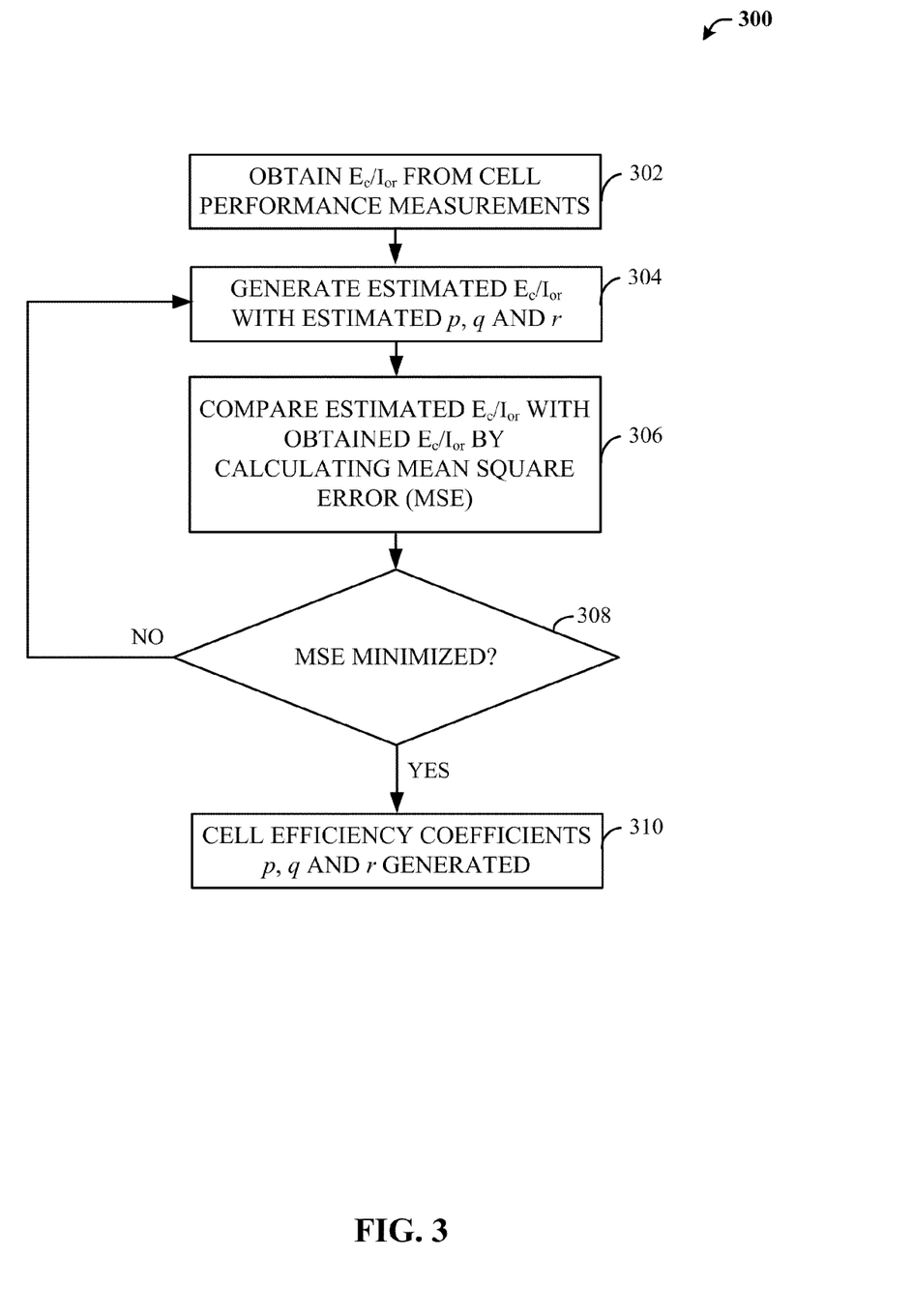
FIG. 3 is a flowchart of an another aspect of a communication network efficiency evaluation process.

FIGS. 2 and 3 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, cell performance measurements may be obtained from a plurality of base stations. In one aspect, such as at reference numeral 202, the cell performance measurements may be requested by a network monitoring entity, such as but not limited to, an RNC, a network management system, a network operator, etc. At reference numeral 204, cell performance measurements may be received. In one aspect, the receiving may include at least one of: receiving cell performance measurements in real time, receiving averaged cell performance measurements from each of the plurality of base stations periodically, receiving cell performance measurements upon a fulfillment of a triggering event, etc. In such an aspect, the triggering event may include at least one of: an operator request, a set duration of time, or a number of data points, etc. In still another aspect, receiving the cell performance measurements may further include receiving a statistically significant number of cell performance measurements, wherein a statistically significant number includes a number of cell performance measurements that reduces an affect of inherent transient performance fluctuations below a predetermined threshold. In such an aspect, the inherent transient performance fluctuations may include at least one of: user distribution fluctuations, mobility level fluctuations, mobility pattern fluctuations, interference fluctuations, weekday-weekend usage fluctuations, etc.

At reference numeral 206, cell efficiency coefficients may be generated. In one aspect, the plurality of cell efficiency coefficients may further comprises three coefficients derived from comparing the obtained transmitted carrier power value and the dedicated channel (DCH) power value for each of the plurality of base stations. In another aspect, each of the plurality of cell efficiency coefficients may corresponds to one or more network efficiency metrics. In such an aspect, the one or more network efficiency metrics may include at least one of: cell interference, path loss, or channel quality, etc. At reference numeral 208, it is determined whether any of the compared base stations are inefficient. In one aspect, the at least one inefficient base station may include at least one base station that has at least one cell efficiency coefficient that differs from the remaining base stations by a predetermined threshold. In another aspect, cell efficiency coefficients may be compared against predetermined thresholds.

If at reference numeral 208, it is determined that no base stations are inefficient, then the process may return to reference numeral 202 and/or 204 for subsequent iterations. By contrast, if at reference numeral 208, at least one base station is determined to be inefficient, then at reference numeral 210, network modification suggestions are generated in response to the applicable cell inefficiency coefficients and are transmitted an RNC, a network management system, a network operator, etc. In one aspect, the at least one network modification suggestion may further including suggesting at least one of: optimizing a coverage area for the at least one inefficient base station, optimizing coverage quality for the at least one inefficient base station, optimizing other-cell interference for at least one inefficient base station, optimizing radio resource management parameters for at least one inefficient base station, adding at least base station, etc. In another aspect, the at least one network modification suggestion may further include a suggestion to prioritizing which of the at least one inefficient base station to address first to improve network efficiency.

In one aspect, at reference numeral 212, it is determined whether the transmitted network modification suggestions were implemented to the applicable network. If at reference numeral 212, the suggestions were not implemented then the process may return to reference numeral 202 or 204 for a subsequent iteration. By contrast, if at least one network modification suggestions was implemented to the applicable network, then the process may stop at reference numeral 214.

Referring to FIG. 3, cell efficiency coefficients may be determined from cell performance measurements. In one aspect, at reference numeral 302 cell performance measurements including $E_c/I$, are obtained from a plurality of base stations. In one aspect, the cell performance measurements are obtained in real time, periodically, upon a fulfillment of a triggering event, etc. At reference numeral 304, for each received value of $E_c/I_{or}$ an estimated $E_c/I_{or}$ is generated according to equation (1) using the cell efficiency coefficients p, q and r. At reference numeral 306, the estimated $E_c/I_{or}$ is compared with the obtained $E_c/I_{or}$. In one aspect, the comparison is made by calculating the mean square error between the two $E_c/I_{or}$ values. At reference numeral 308, it is determined whether the calculated mean square error is substantially minimized. In one aspect, the determination as to whether the calculated mean square error is substantially minimized may be made with reference to a threshold value.

If at reference numeral 308, the mean square error value is not substantially minimized, then a numerical equation solver may iteratively modify the cell efficiency coefficients p, q and r and return to reference numeral 304 to generate a new estimated $E_c/I_{or}$ value for subsequent iterative comparisons. By contrast, if at reference numeral 308, the mean square error value is substantially minimized, then at reference numeral 310, it is determined that cell efficiency coefficients p, q and r have been generated. In one aspect, such generated cell efficiency coefficients may be used to determine inefficient base stations, such as in the process discussed with reference to FIG. 2.

Figure 4:
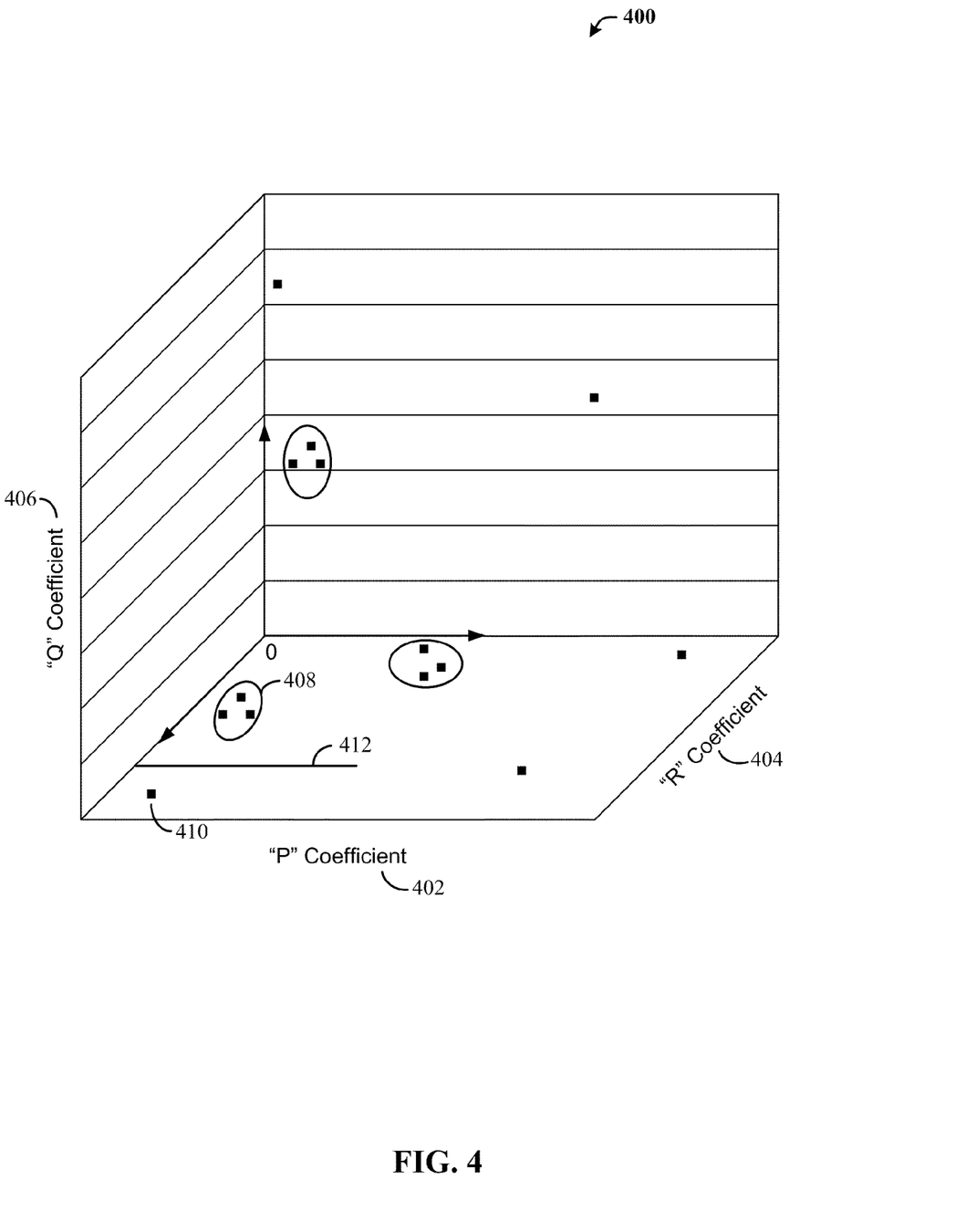
FIG. 4 illustrates an exemplary graph cell efficiency coefficients determined by an aspect depicted in FIG. 1.

With reference to FIG. 4, an exemplary three dimensions graphical presentation of three cell efficiency coefficients. As depicted in FIG. 4, each axis corresponds to a cell efficiency coefficient, such as the p, q, and r cell efficiency coefficients described above with reference to FIG. 1. For example, a first axis 402 may represent p values, a second axis 404 may represent r values, and a third axis 406 may represent q values. In operation, cell efficiency coefficients for each base station may be plotted on the three dimensional graph. In the depicted example, a group of base stations 408 have approximately the value of at least one of the cell efficiency coefficients, while one base station 410 has a comparatively greater value for at least one of the cell efficiency coefficients. Further, one or more thresholds, such as threshold 412, may be used to determine if base station 410 is considered sufficiently inefficient to merit further action, such as generation of a network optimization suggestion. In one aspect, threshold 412 may be configured in any number of ways, including a line (as depicted in FIG. 4), multiple lines, a surface, multiple surfaces, or any combination thereof and/or user defined configuration.

Figure 5:
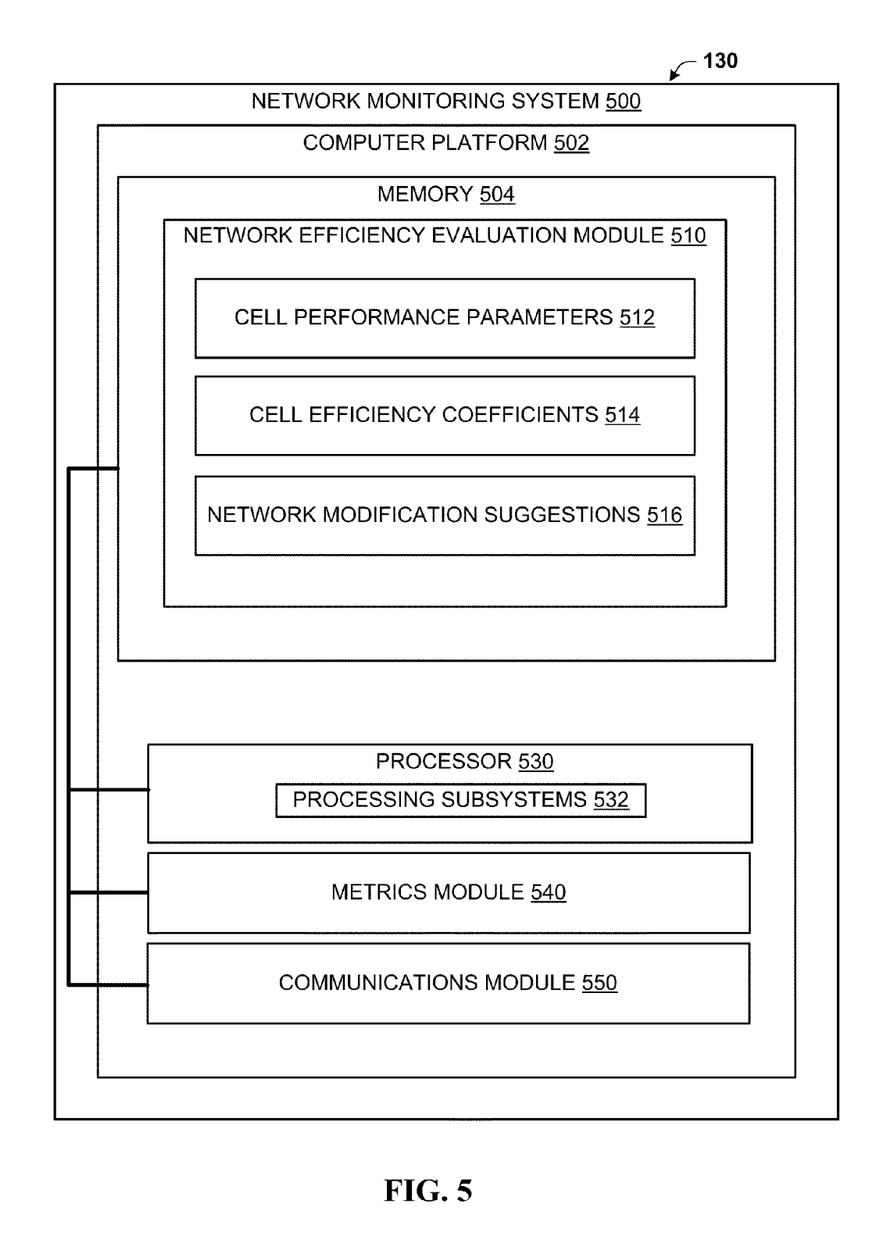
FIG. 5 illustrates exemplary block diagram of a network monitoring system according to an aspect.

With reference to FIG. 5, illustrated is a detailed block diagram of network monitoring system 500, such as network management system 130 depicted in FIG. 1. Network monitoring system 500 may comprise at least one of any type of hardware, server, personal computer, mini computer, mainframe computer, or any computing device either special purpose or general computing device. Further, the modules and applications described herein as being operated on or executed by network monitoring system 500 may be executed entirely on a single network device, as shown in FIG. 5, or alternatively, in other aspects, separate servers, databases or computer devices may work in concert to provide data in usable formats to parties, and/or to provide a separate layer of control in the data flow between communications devices 120, base stations 110, and the modules and applications executed by network monitoring system 500.

Network monitoring system 500 includes computer platform 502 that can transmit and receive data across wired and wireless networks, and that can execute routines and applications. Computer platform 502 includes memory 504, which may comprise volatile and nonvolatile memory such as read-only and/or random-access memory (ROM and RAM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Further, computer platform 502 also includes processor 530, which may be an application-specific integrated circuit ("ASIC"), or other chipset, logic circuit, or other data processing device. Processor 530 may include various processing subsystems 532 embodied in hardware, firmware, software, and combinations thereof, that enable the functionality of network efficient evaluation module 510 and the operability of the network device on a wired or wireless network.

Computer platform 502 further includes communications module 550 embodied in hardware, firmware, software, and combinations thereof, that enables communications among the various components of network monitoring system 500, as well as between network monitoring system 500 and base stations 110. Communication module 550 may include the requisite hardware, firmware, software and/or combinations thereof for establishing a wireless communication connection. According to described aspects, communication module 550 may include the necessary hardware, firmware and/or software to facilitate wireless broadcast, multicast and/or unicast communication of requested cell performance measurements, cell efficiency coefficients, network modification suggestions, etc.

Computer platform 502 further includes metrics module 540, embodied in hardware, firmware, software, and combinations thereof, that enables metrics received from base stations 110 corresponding to, among other things, data communicated from devices 120. In one aspect, network monitoring system 500 may analyze data received through metrics module 540 to generate cell efficiency coefficients, network modification suggestions, etc. For example, if the metrics module 540 returns data indicating that one or more of a plurality of base stations are inefficient, then the network monitoring system 500 may generate network modification suggestions and may transmit such suggestions may be provided to a network operator, and/or may be automatically implemented.

Memory 504 of network monitoring system 500 includes network efficient evaluation module 510 operable for assisting in network efficiency evaluations. In one aspect, network efficient evaluation module 510 may include cell performance measurements 512, cell efficiency coefficients 514 and network modification suggestions 516.

In one aspect, network efficiency evaluation module 510 may use obtained cell performance measurements 512 to derive cell efficiency coefficients 514. In such an aspect, dedicated channel (DCH) power measurements ($I_{or}$) and transmitted carrier power measurements ($E_c$) may be used to derive cell efficiency coefficients 514 ("p," "q" and "r"), as seen in equations (1)-(4) above. In one aspect, cell efficiency coefficients 514 ("p," "q" and "r") may provide indications of various cell inefficiencies. For example, a comparatively high value of p among measured base stations 110 may indicate interference issues and may be comparatively better candidates for further radio frequency (RF) evaluation and/or RF optimization so as to reduce interference. In another example, a comparatively high value of r among measured base stations 110 may indicate channel quality issues. Such base stations may be comparatively better candidates for re-adjustment of radio resource management parameters, such as mobility control parameters, so to offload high mobility traffic to increase network capacity. In yet another example, a comparatively high value of q among measured base stations 110 may indicate large path loss. In such an example, path loss may result from usage in locations that are relatively distant from the location of the serving base stations. As such, a network operator may suggest adding network hardware, such as additional base stations 110 to the region near a base station with a comparatively high value of q. Further, any combination of metrics derived from cell efficiency coefficients 514, such as the examples described above, may be used to generate network modification suggestions 516. In one aspect, such network modification suggestions 516 may be provided to a network operator, and/or may be automatically implemented.

Figure 6:
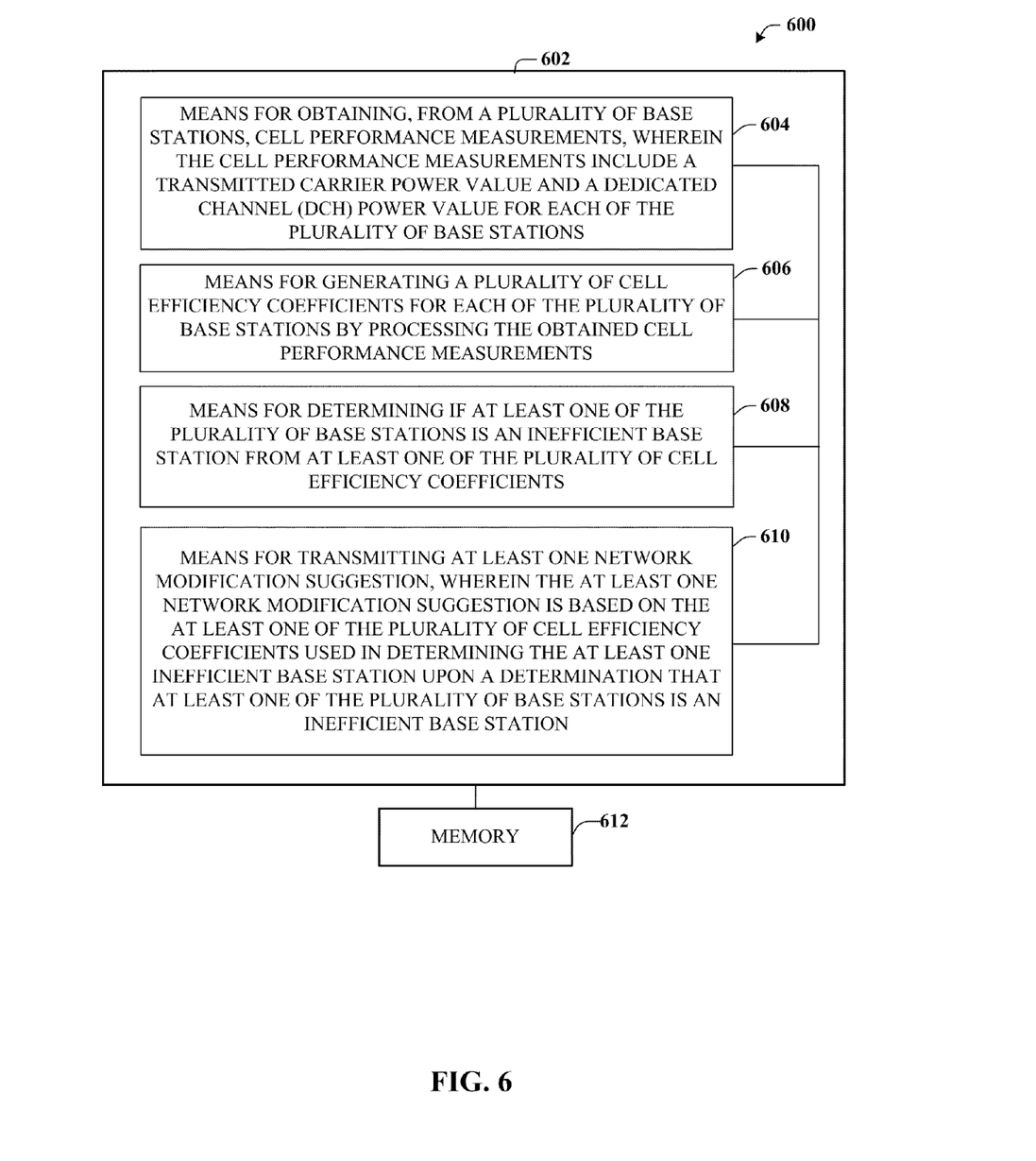
FIG. 6 illustrates a block diagram of an exemplary communications device that can evaluate base station efficiency in a network.

With reference to FIG. 6, a block diagram of an exemplary system 600 that can evaluate base station efficiency in a network is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware).

System 600 includes a logical grouping 602 of means that can act in conjunction. For instance, logical grouping 602 can include means for obtaining, from a plurality of base stations, cell performance measurements, wherein the cell performance measurements include a transmitted carrier power value and a dedicated channel (DCH) power value for each of the plurality of base stations 604. In one aspect, the obtaining may further comprises: receiving, from the plurality of base stations, cell performance measurements, wherein the receiving may include at least one of: receiving cell performance measurements in real time, receiving averaged cell performance measurements from each of the plurality of base stations periodically, receiving cell performance measurements upon a fulfillment of a triggering event, etc. In such an aspect, the triggering event may include at least one of: an operator request, a set duration of time, or a number of data points, etc. In another aspect, the obtaining may further comprises requesting to receive the cell performance measurements from the plurality of base stations by at least one of: a radio network controller, a network management system, or a network efficiency server, etc. In still another aspect, the obtaining may further comprise, obtaining a statistically significant number of cell performance measurements, wherein a statistically significant number includes a number of cell performance measurements that reduces an affect of inherent transient performance fluctuations below a predetermined threshold. In such an aspect, the inherent transient performance fluctuations may include at least one of: user distribution fluctuations, mobility level fluctuations, mobility pattern fluctuations, interference fluctuations, weekday-weekend usage fluctuations, etc. In yet another aspect, the plurality of base stations may comprises a subgroup of available base stations which have been selected as inefficient base stations. In still another aspect, the dedicated channel (DCH) power value for each of the plurality of base stations may further include obtaining a total voice dedicated channel value and a number of users for each of the plurality of base stations, and dividing the total voice dedicated channel value by the number of users to derive the dedicated channel (DCH) power value for each of the plurality of base stations.

Further, logical grouping 602 can comprise means for generating a plurality of cell efficiency coefficients for each of the plurality of base stations by processing the obtained cell performance measurements 606. In one aspect, the plurality of cell efficiency coefficients may further comprises three coefficients derived from comparing the obtained transmitted carrier power value and the dedicated channel (DCH) power value for each of the plurality of base stations. In another aspect, each of the plurality of cell efficiency coefficients may corresponds to one or more network efficiency metrics. In such an aspect, the one or more network efficiency metrics may include at least one of: cell interference, path loss, or channel quality, etc.

Further, logical grouping 602 can comprise means for determining if at least one of the plurality of base stations is an inefficient base station from at least one of the plurality of cell efficiency coefficients 610. In one aspect, the at least one inefficient base station may include at least one base station that has at least one cell efficiency coefficient that comparatively differs from the remaining base stations by a predetermined threshold. In another aspect, the at least one inefficient base station may include at least one base station that has at least one cell efficiency coefficient below a predetermined threshold. Further, logical grouping 602 can comprise means for transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station 612. In one aspect, the at least one network modification suggestion may further including suggesting at least one of: optimizing a coverage area for the at least one inefficient base station, optimizing content coverage for the at least one inefficient base station, adding at least base station, etc. In another aspect, the at least one network modification suggestion may further include a suggestion to prioritizing which of the at least one inefficient base station to address first to improve network efficiency.

Additionally, system 600 can include a memory 612 that retains instructions for executing functions associated with the means 604, 606, 608 and 610. While shown as being external to memory 612, it is to be understood that one or more of the means 604, 606, 608 and 610 can exist within memory 612.

Figure 7:
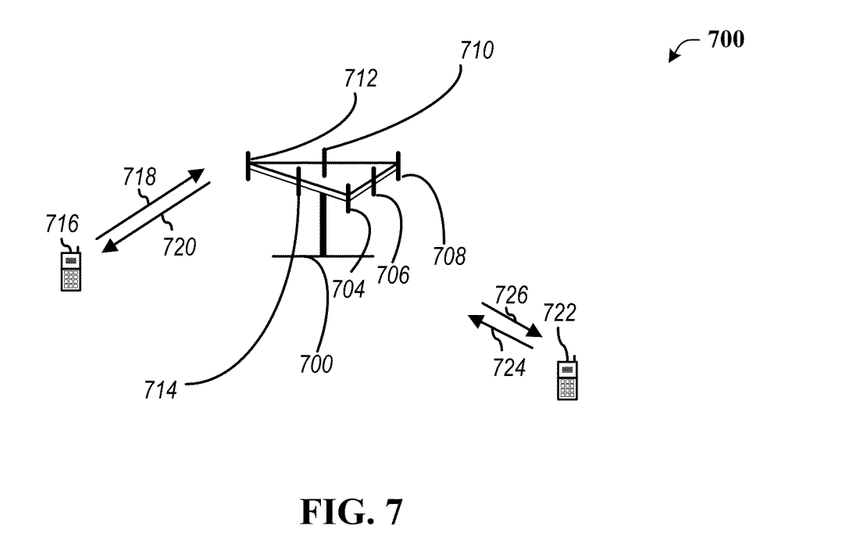
FIG. 7 illustrates an exemplary multiple access wireless communication system according to an aspect.

Referring to FIG. 7, a multiple access wireless communication system according to one aspect is illustrated. An access point 700 (AP) includes multiple antenna groups, one including 704 and 706, another including 708 and 710, and an additional including 712 and 714. In FIG. 7, only two antennas are shown for each antenna group, however, more or fewer antennas may be utilized for each antenna group. Access terminal 716 (AT) is in communication with antennas 712 and 714, where antennas 712 and 714 transmit information to access terminal 716 over forward link 720 and receive information from access terminal 716 over reverse link 718. Access terminal 722 is in communication with antennas 706 and 708, where antennas 706 and 708 transmit information to access terminal 722 over forward link 726 and receive information from access terminal 722 over reverse link 724. In a FDD system, communication links 718, 720, 724 and 726 may use different frequency for communication. For example, forward link 720 may use a different frequency then that used by reverse link 718.

Each group of antennas and/or the area in which they are designed to communicate is often referred to as a sector of the access point. In the aspect, antenna groups each are designed to communicate to access terminals in a sector, of the areas covered by access point 700.

In communication over forward links 720 and 726, the transmitting antennas of access point 700 utilize beamforming in order to improve the signal-to-noise ratio of forward links for the different access terminals 716 and 724. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for evaluating base station efficiency in a network, the method comprising:
   obtaining, from a plurality of base stations, cell performance measurements, wherein the cell performance measurements include a transmitted carrier power value and a dedicated channel (DCH) power value for each of the plurality of base stations, wherein the obtaining further comprises receiving, from the plurality of base stations, cell performance measurements, wherein the receiving includes at least one of: receiving cell performance measurements in real time, receiving averaged cell performance measurements from each of the plurality of base stations periodically, or receiving cell performance measurements upon a fulfillment of a triggering event;
   generating, by a network system, a plurality of cell efficiency coefficients for each of the plurality of base stations by processing the obtained cell performance measurements;
   determining if at least one of the plurality of base stations is an inefficient base station from at least one of the plurality of cell efficiency coefficients; and
   upon a determination that at least one of the plurality of base stations is an inefficient base station, transmitting at least one network modification suggestion, wherein the at least one network modification suggestion is based on the at least one of the plurality of cell efficiency coefficients used in determining the at least one inefficient base station.

2. The method of claim 1, wherein the triggering event includes at least one of: a operator request, a set duration of time, or a number of data points.

3. The method of claim 1, wherein the obtaining further comprises:
   requesting to receive the cell performance measurements from the plurality of base stations by at least one of: a radio network controller, a network management system, or a network efficiency server.

4. The method of claim 1, wherein the obtaining further comprises:
   obtaining a statistically significant number of cell performance measurements, wherein a statistically significant number includes a number of cell performance measurements that reduces an affect of at least one inherent transient performance fluctuations below a predetermined threshold.

5. The method of claim 4, wherein the at least one inherent transient performance fluctuations includes at least one of: user distribution fluctuations, mobility level fluctuations, mobility pattern fluctuations, interference fluctuations, or weekday-weekend usage fluctuations.

6. The method of claim 1, wherein the plurality of base stations comprises:
   a subgroup of available base stations which have been selected as inefficient base stations.

7. The method of claim 1, wherein the dedicated channel (DCH) power value for each of the plurality of base stations further comprises:
   obtaining a total voice dedicated channel value and a number of users for each of the plurality of base stations, and dividing the total voice dedicated channel value by the number of users to derive the dedicated channel (DCH) power value for each of the plurality of base stations.

8. The method of claim 1, wherein the plurality of cell efficiency coefficients further comprises three coefficients derived from processing the obtained transmitted carrier power value and the dedicated channel (DCH) power value for each of the plurality of base stations.

9. The method of claim 1, wherein each of the plurality of cell efficiency coefficients corresponds to one or more network efficiency metrics.

10. The method of claim 9, wherein the one or more network efficiency metrics include at least one of: cell interference, path loss, or channel quality.

11. The method of claim 1, wherein the at least one inefficient base station includes at least one of:
    at least one base station that has at least one cell efficiency coefficient that comparatively differs from the remaining base stations by a predetermined threshold, or
    at least one base station that has at least one cell efficiency coefficient that is below a predetermined threshold.

12. The method of claim 1, wherein the at least one network modification suggestion further comprises suggesting at least one of:
    optimizing a coverage area for the at least one inefficient base station;
    optimizing at least one radio resource management parameter for the at least one inefficient base station; or
    adding at least base station.

13. The method of claim 1, wherein the at least one network modification suggestion further comprises:
    a suggestion to prioritizing which of the at least one inefficient base station to address first to improve network efficiency.

14. The method of claim 1, wherein the network management system comprises a radio network controller (RNC).

15. At least one processor configured to evaluate base station efficiency in a network:
    a first module for obtaining, from a plurality of base stations, cell performance measurements, wherein the cell performance measurements include a transmitted carrier power value and a dedicated channel (DCH) power value for each of the plurality of base stations, wherein the first module for obtaining is configured to receive, from the plurality of base stations, cell performance measurements, wherein the receiving includes at least one of: receiving cell performance measurements in real time, receiving averaged cell performance measurements from each of the plurality of base stations periodically, or receiving cell performance measurements upon a fulfillment of a triggering event;

a second module for generating, by a network management system, a plurality of cell efficiency coefficients for each of the plurality of base stations by processing the obtained cell performance measurements;

a third module for determining if at least one of the plurality of base stations is an inefficient base station from at least one of the plurality of cell efficiency coefficients; and a fourth module for transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

16. A computer program product, comprising:

a non-transitory computer-readable medium comprising:

a first set of codes for causing a computer to obtain, from a plurality of base stations, cell performance measurements, wherein the cell performance measurements include a transmitted carrier power value and a dedicated channel (DCH) power value for each of the plurality of base stations, wherein the first set of codes further comprises codes for causing a computer to receive, from the plurality of base stations, cell performance measurements, wherein the codes include at least one of: codes for receiving cell performance measurements in real time, codes for receiving averaged cell performance measurements from each of the plurality of base stations periodically, or codes for receiving cell performance measurements upon a fulfillment of a triggering event;

a second set of codes for causing the computer to generate, by a network management system, a plurality of cell efficiency coefficients for each of the plurality of base stations by processing the obtained cell performance measurements;

a third set of codes for causing the computer to determine if at least one of the plurality of base stations is an inefficient base station from at least one of the plurality of cell efficiency coefficients; and a fourth set of codes for causing the computer to transmit at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

17. An apparatus, comprising:

means for obtaining, from a plurality of base stations, cell performance measurements, wherein the cell performance measurements include a transmitted carrier power value and a dedicated channel (DCH) power value for each of the plurality of base stations, wherein the means for obtaining further comprises means for receiving, from the plurality of base stations, cell performance measurements, wherein the means for receiving includes at least one of: means for receiving cell performance measurements in real time, means for receiving averaged cell performance measurements from each of the plurality of base stations periodically, or means for receiving cell performance measurements upon a fulfillment of a triggering event;

means for generating, by a network management system, a plurality of cell efficiency coefficients for each of the plurality of base stations by processing the obtained cell performance measurements;

means for determining if at least one of the plurality of base stations is an inefficient base station from at least one of the plurality of cell efficiency coefficients; and means for transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

18. An apparatus, comprising:

a communications module for:

obtaining, from a plurality of base stations, cell performance measurements, wherein the cell performance measurements include a transmitted carrier power value and a dedicated channel (DCH) power value for each of the plurality of base stations, wherein the obtaining includes at least one of: receiving, from the plurality of base stations, cell performance measurements in real time; receiving averaged cell performance measurements from each of the plurality of base stations periodically, or receiving cell performance measurements upon a fulfillment of a triggering event;

a network efficiency module for:

generating, by a network management system, a plurality of cell efficiency coefficients for each of the plurality of base stations by processing the obtained cell performance measurements; and determining if at least one of the plurality of base stations is an inefficient base station from at least one of the plurality of cell efficiency coefficients; and wherein the communication module is further operable for:

transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

19. The apparatus of claim 18, wherein the triggering event includes at least one of: a operator request, a set duration of time, or a number of data points.

20. The apparatus of claim 18, wherein the communication module is further operable for:

requesting to receive the cell performance measurements from the plurality of base stations by at least one of: a radio network controller, a network management system, or a network efficiency server.

21. The apparatus of claim 18, wherein the communication module is further operable for:

obtaining a statistically significant number of cell performance measurements, wherein a statistically significant number includes a number of cell performance measurements that reduces an affect of at least one inherent transient performance fluctuations below a predetermined threshold.

22. The apparatus of claim 21, wherein the at least one inherent transient performance fluctuations includes at least one of: user distribution fluctuations, mobility level fluctuations, mobility pattern fluctuations, interference fluctuations, or weekday-weekend usage fluctuations.

23. The apparatus of claim 18, wherein the plurality of base stations comprises:
a subgroup of available base stations which have been selected as inefficient base stations.

24. The apparatus of claim 18, wherein the communication module is further operable for:
obtaining a total voice dedicated channel value and a number of users for each of the plurality of base stations, and dividing the total voice dedicated channel value by the number of users to derive the dedicated channel (DCH) power value for each of the plurality of base stations.

25. The apparatus of claim 18, wherein the plurality of cell efficiency coefficients further comprises three coefficients derived from processing the obtained transmitted carrier power value and the dedicated channel (DCH) power value for each of the plurality of base stations.

26. The apparatus of claim 18, wherein each of the plurality of cell efficiency coefficients corresponds to one or more network efficiency metrics.

27. The apparatus of claim 26, wherein the one or more network efficiency metrics include at least one of: cell interference, path loss, or channel quality.

28. The apparatus of claim 18, wherein the at least one inefficient base station includes at least one of:
at least one base station that has at least one cell efficiency coefficient that comparatively differs from the remaining base stations by a predetermined threshold, or
at least one base station that has at least one cell efficiency coefficient that is below a predetermined threshold.

29. The apparatus of claim 18, wherein the at least one network modification suggestion further comprises suggesting at least one of:
optimizing a coverage area for the at least one inefficient base station;
optimizing at least one radio resource management parameter for the at least one inefficient base station; or
adding at least base station.

30. The apparatus of claim 18, wherein the at least one network modification suggestion further comprises: a suggestion to prioritizing which of the at least one inefficient base station to address first to improve network efficiency.

31. The method of claim 18, wherein the network management system comprises a radio network controller (RNC).

32. A method for evaluating base station efficiency in a network, the method comprising:
obtaining, from a plurality of base stations, cell performance measurements, wherein the cell performance measurements include a transmitted carrier power value and a dedicated channel (DCH) power value for each of the plurality of base stations;
generating a plurality of cell efficiency coefficients for each of the plurality of base stations by processing the obtained cell performance measurements, wherein the plurality of cell efficiency coefficients further comprises three coefficients derived from processing the obtained transmitted carrier power value and the dedicated channel (DCH) power value for each of the plurality of base stations, and wherein the three coefficients are p, q, and r, and wherein the processing further comprises computing the three coefficients p, q, and r, that minimize the absolute value of the expression $$\frac{E_c}{I_{or}} - p \cdot r - \frac{q \cdot r}{I_{or}},$$

wherein $E_c$ represents the DCH power value and $I_{or}$ represents the transmitted carrier power value;
determining if at least one of the plurality of base stations is an inefficient base station from at least one of the plurality of cell efficiency coefficients; and
upon a determination that at least one of the plurality of base stations is an inefficient base station, transmitting at least one network modification suggestion, wherein the at least one network modification suggestion is based on the at least one of the plurality of cell efficiency coefficients used in determining the at least one inefficient base station.

33. An apparatus, comprising:
a communications module for:
obtaining, from a plurality of base stations, cell performance measurements, wherein the cell performance measurements include a transmitted carrier power value and a dedicated channel (DCH) power value for each of the plurality of base stations;
a network efficiency module for:
generating a plurality of cell efficiency coefficients for each of the plurality of base stations by processing the obtained cell performance measurements, wherein the plurality of cell efficiency coefficients further comprises three coefficients derived from processing the obtained transmitted carrier power value and the dedicated channel (DCH) power value for each of the plurality of base stations, and wherein the three coefficients are p, q, and r, and wherein the processing further comprises computing the three coefficients p, q, and r, that minimize the absolute value of the expression $$\frac{E_c}{I_{or}} - p \cdot r - \frac{q \cdot r}{I_{or}},$$

wherein $E_c$ represents the DCH power value and $I_{or}$ represents the transmitted carrier power value; and
determining if at least one of the plurality of base stations is an inefficient base station from at least one of the plurality of cell efficiency coefficients; and
wherein the communication module is further operable for:
transmitting at least one network modification suggestion, wherein the at least one network modification suggestion is based on the at least one of the plurality of cell efficiency coefficients used in determining the at least one inefficient base station upon a determination that at least one of the plurality of base stations is an inefficient base station.

* * * * *